United States Patent
Tsunematsu et al.

(10) Patent No.: US 8,500,998 B2
(45) Date of Patent: Aug. 6, 2013

(54) HYDRAULIC CONTROL DEVICE

(75) Inventors: Ko Tsunematsu, Kariya (JP); Tomoyuki Ishikawa, Anjo (JP); Atsushi Yamanaka, Aichi-ken (JP)

(73) Assignee: Aisin AW Co., Ltd., Aichi-ken (JP)

( * ) Notice: Subject to any disclaimer, the term of this patent is extended or adjusted under 35 U.S.C. 154(b) by 219 days.

(21) Appl. No.: 13/042,830

(22) Filed: Mar. 8, 2011

(65) Prior Publication Data

US 2011/0240149 A1  Oct. 6, 2011

(30) Foreign Application Priority Data

Mar. 30, 2010 (JP) ................. 2010-079394

(51) Int. Cl.
*F01M 11/03* (2006.01)
*B01D 29/00* (2006.01)
*B01D 35/06* (2006.01)

(52) U.S. Cl.
USPC ............ 210/167.03; 210/167.01; 210/167.02; 210/167.08; 210/167.29; 210/172.1; 210/172.2; 210/223; 210/416.5

(58) Field of Classification Search
None
See application file for complete search history.

(56) References Cited

U.S. PATENT DOCUMENTS 7,637,336 B2 * 12/2009 Enomoto et al. ............. 180/69.1

FOREIGN PATENT DOCUMENTS

| JP | 58-094671 A | | 6/1983 |
| JP | 02-081996 | * | 6/1990 |
| JP | 2-81996 U | | 6/1990 |
| JP | 6-13725 U | | 2/1994 |
| JP | 6-15716 U | | 3/1994 |
| JP | 7-24405 U | | 5/1995 |
| JP | 2000-249214 A | | 9/2000 |

OTHER PUBLICATIONS

International Search Report (ISR) for corresponding International Patent Application No. PCT/JP2011/052998 mailed Mar. 8, 2011.

* cited by examiner

*Primary Examiner* — Benjamin Kurtz
(74) *Attorney, Agent, or Firm* — Sughrue Mion, PLLC

(57) ABSTRACT

A hydraulic control device includes a valve body having oil passages, a solenoid valve incorporated in the valve body, an oil pan that is disposed below the valve body and that accumulates hydraulic oil, and a strainer which, as well as being disposed between the valve body and the oil pan, has a filtering medium which filters the hydraulic oil suctioned from the oil pan. The strainer is fixed to the oil pan by a magnetic force of at least one magnet.

4 Claims, 3 Drawing Sheets

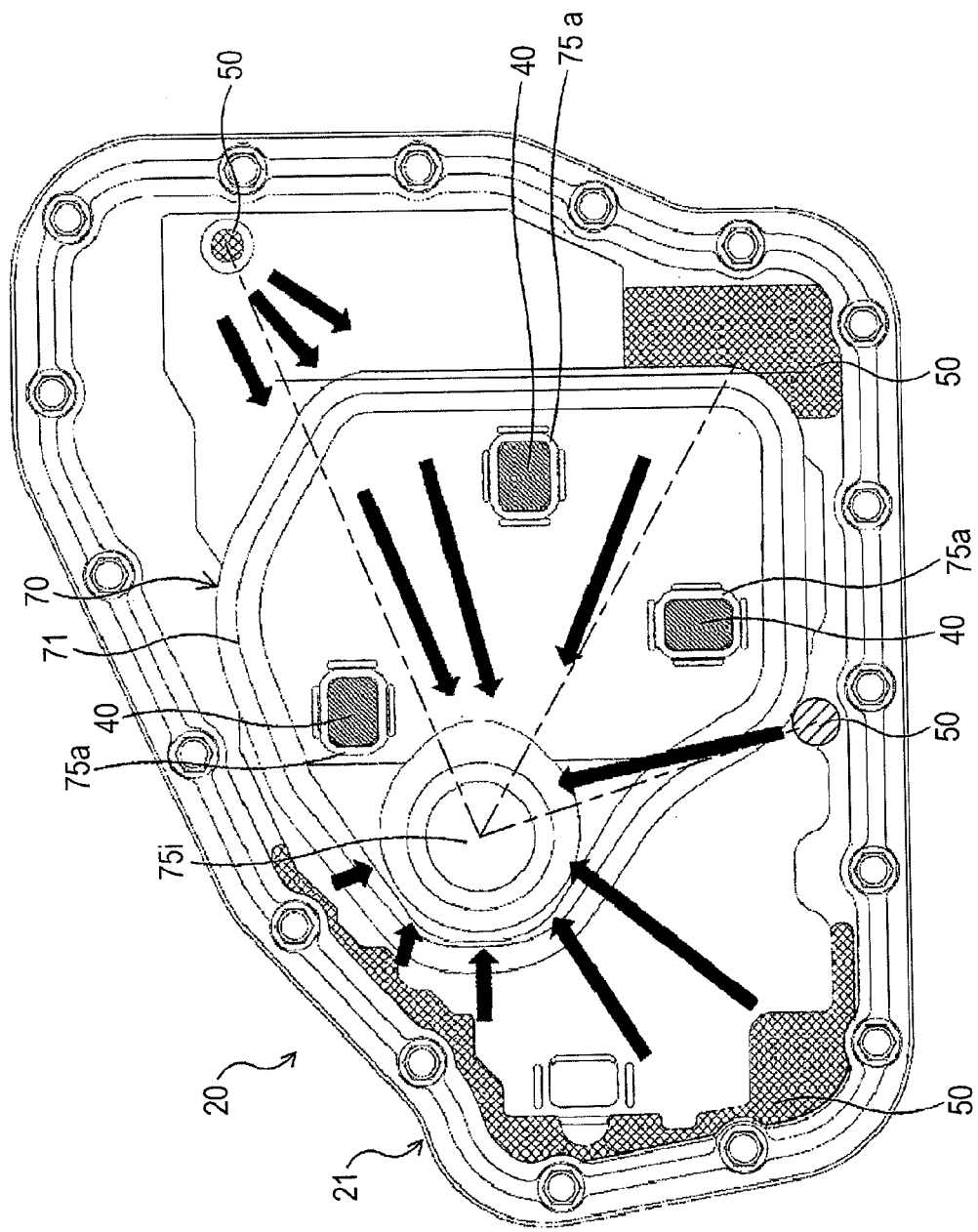

HYDRAULIC CONTROL DEVICE

INCORPORATION BY REFERENCE

The disclosure of Japanese Patent Application No. 2010-079394 filed on Mar. 30, 2010, including the specification, drawings and abstract thereof, is incorporated herein by reference in its entirety.

BACKGROUND OF THE INVENTION

1. Field of the Invention

The present invention relates to a hydraulic control device including a valve body having a plurality of oil passages, an oil pan which, being disposed below the valve body, accumulates hydraulic oil, and a strainer which, as well as being disposed between the valve body and the oil pan, has a filtering medium which filters the hydraulic oil suctioned from the oil pan.

2. Description of the Related Art

Heretofore, as this kind of hydraulic control device, one including a valve body assembled with a control valve, an oil pan which stores oil to be provided to the valve body, and a strainer device which, as well as being disposed inside the oil pan, has a filter which filters the oil suctioned from the oil pan, has been proposed (for example, refer to JP-A-58-94671). With this hydraulic control device, the strainer device is detachably attached to the valve body using a bolt. Also, as this kind of hydraulic control device, one including a valve body fixed to a bottom portion of a casing, an oil passage seal plate which seals an oil passage opening into an undersurface of the valve body, an oil strainer disposed on the undersurface side of the valve body, and an oil pan which, as well as covering the undersurface side of the valve body and oil strainer, accumulates hydraulic oil, has been proposed (for example, refer to JP-A-2000-249214). With this hydraulic control device, as well as a plurality of fixing claws provided on the top of the oil strainer being engaged with the oil passage seal plate, a projection provided on the bottom is abutted against the oil pan, thereby fixing the oil strainer without using a fastener such as a bolt.

SUMMARY OF THE INVENTION

It is not preferable to fix the strainer device to the valve body using a bolt, as in the heretofore described hydraulic control device described in JP-A-58-94671, because it involves an increase in the number of parts and an increase in assembling man-hours. Also, (there is also a danger of a bolted portion being damaged in a case of using a strainer device made of a resin. Furthermore,) even in the event that the fixing claws or the like are provided on the strainer device, and the strainer device is fixed to the valve body or the like without using a bolt, as in the hydraulic control device described in JP-A-2000-249214, there is a danger of the structure of the hydraulic control device being complicated, eventually involving an increase in the number of parts and an increase in man-hours.

The hydraulic control device of the invention has a main object of stably and easily fixing a strainer between a valve body and an oil pan while curbing a complication in structure and an increase in the number of parts.

The hydraulic control device of the invention adopts the following mechanism in order to achieve the heretofore described main object.

The hydraulic control device of the invention is a hydraulic control device including a valve body having a plurality of oil passages, a solenoid valve incorporated in the valve body, an oil pan which, being disposed below the valve body, accumulates hydraulic oil, and a strainer which, as well as being disposed between the valve body and the oil pan, has a filtering medium which filters the hydraulic oil suctioned from the oil pan, wherein the strainer is fixed to the oil pan by a magnetic force of at least one magnet.

With the hydraulic control device of the invention, the strainer for filtering the hydraulic oil from the oil pan is fixed to the oil pan by the magnetic force of at least one magnet. Because of this, it is possible to stably and easily fix the strainer between the valve body and the oil pan while curbing a complication in structure and an increase in the number of parts in a case of using a fastener such as a bolt. Also, with the hydraulic control device of the invention, it is also possible to capture foreign particles such as metal powder contained in the hydraulic oil in the oil pan using the magnet for fixing the strainer to the oil pan. The magnet may be adsorbed to both the oil pan and an oil pan side portion of the strainer, and may be fixed (bonded) to one of the two and adsorbed to the other.

Also, the strainer may have a housing which houses the filtering medium, a bottom portion of the housing on the oil pan side may include a projection which projects toward the oil pan in such a way as to define a depression in the housing, and the magnet may be disposed between the projection and the oil pan.

By disposing the magnet between the projection provided on the bottom portion of the housing of the strainer and the oil pan in this way, it is possible to reduce the height of the magnet, and also, to appropriately set the distance between the oil pan and strainer. Also, when the magnetic force of the magnet disposed between the projection of the housing and the oil pan acts on the back side of the projection, that is, the side of the depression in the housing, it is possible to attract foreign particles such as metal powder contained in the hydraulic oil in the housing of the strainer with the magnetic force of the magnet, and retain them in the depression.

Furthermore, at least the projection of the housing may be formed from a magnetic body. Because of this, by causing the magnetic force of the magnet disposed between the projection of the housing and the oil pan to act more strongly on the back side of the projection, that is, the side of the depression in the housing, it is possible to more strongly attract foreign particles such as metal powder contained in the hydraulic oil in the housing of the strainer with the magnetic force of the magnet, and more reliably retain them in the depression.

Furthermore, the magnet may be not disposed on a straight line connecting a hydraulic oil inflow portion connecting with the oil pan and a hydraulic oil inlet of the strainer. In this way, it is possible to prevent the flow of the hydraulic oil in the oil pan from being impeded by the magnet.

BRIEF DESCRIPTION OF THE DRAWINGS

FIG. 3 is an illustration of the hydraulic control device 20 in a condition in which an oil pan 60 is removed as seen from the underside.

DETAILED DESCRIPTION OF THE INVENTION

Next, a description will be given, using an embodiment, of a mode for carrying out the invention.

Figure 1:
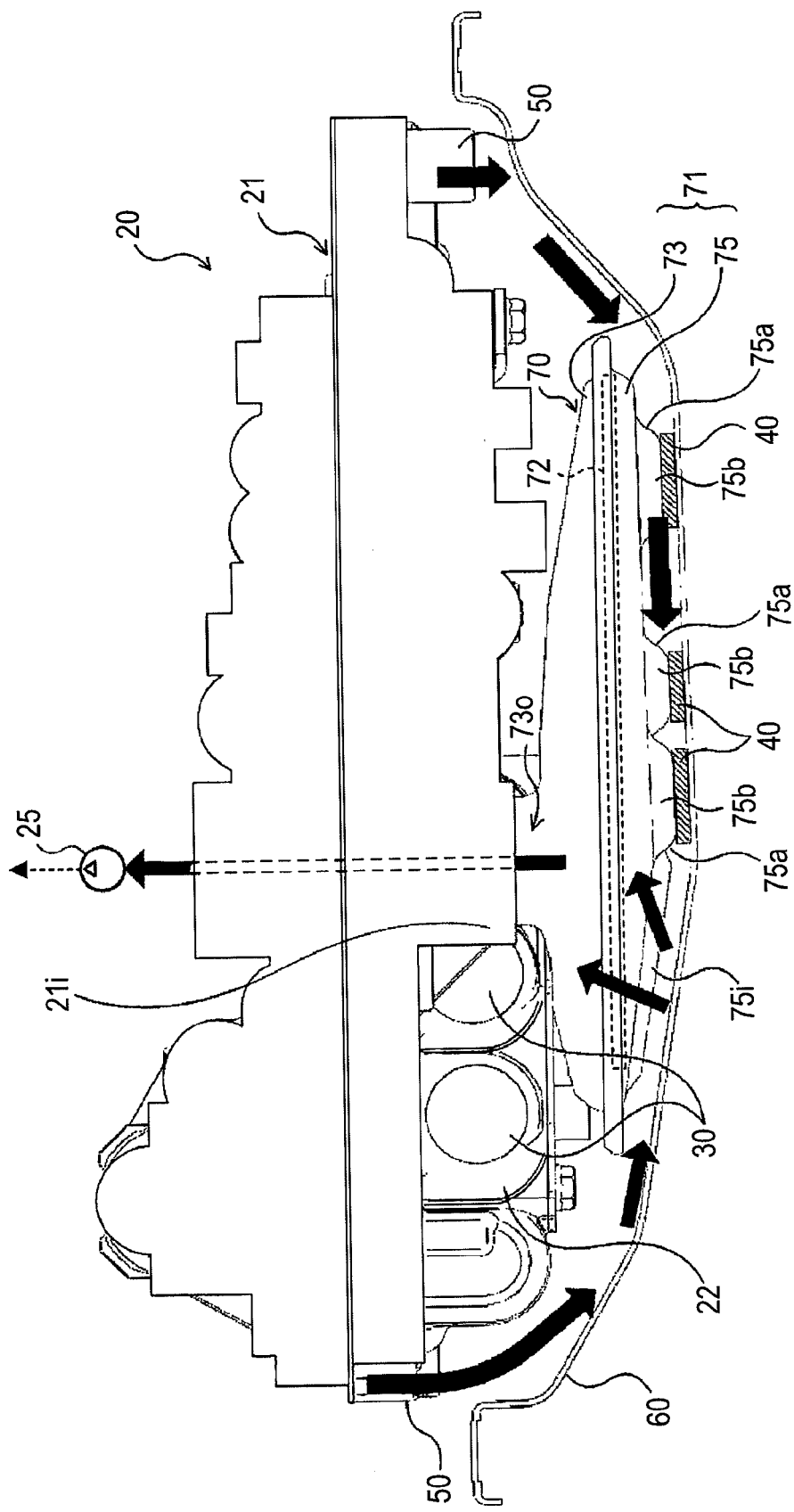
FIG. 1 is an illustration showing a hydraulic control device 20 according to an embodiment of the invention.

FIG. 1 is an illustration showing a hydraulic control device 20 according to the embodiment of the invention. The hydraulic control device 20 of the embodiment configures, for example, a power transmission device together with an automatic transmission, a differential gear, and the like, which transmit power from an unshown engine mounted in an automobile to a drive shaft (a propeller shaft), and is used for a speed change control or the like of the automatic transmission. The hydraulic control device 20 of the embodiment includes a valve body 21 having an unshown plurality of oil passages, a plurality of solenoid valves 30 which, being incorporated in the valve body 21, configure a hydraulic circuit together with the oil passages of the valve body 21, an unshown control module for controlling the whole of the automatic transmission, an oil pan 60 which, as well as being formed from a plate material (for example, a steel plate) such as a metal which is a magnetic body, accumulates hydraulic oil (ATF), a strainer 70 which filters the hydraulic oil suctioned from the oil pan 60 by an oil pump 25 and removes foreign particles or the like such as metal powder arising in the automatic transmission, differential gear, or the like, and the like.

As shown in FIG. 1, a plurality of valve insertion portions 22 which, as well as having the solenoid valves 30 inserted one in each thereof, allow communication between valve portions of the corresponding solenoid valves 30 and the oil passages in the valve body 21, a plurality of oil pressure introduction holes (not shown) communicating with corresponding hydraulic switches, a cylinder insertion portion (not shown) in which a parking cylinder is inserted, and the like, are formed in the valve body 21.

A linear solenoid valve which adjusts an oil pressure (a line pressure) generated by the oil pump 25 driven by the unshown engine and sends it to the side of an unshown plurality of clutches (brakes) of the automatic transmission, and an on/off solenoid valve which outputs a drive pressure signal to an unshown relay valve which carries out a switching between supply destinations of the hydraulic oil, are included in the solenoid valves 30. Also, an unshown valve side connector for an electrical connection to the control module is attached to each solenoid valve 30. The control module drives and controls the solenoid valves 30 and the like (the hydraulic circuit) in such a way that a requested speed change condition is realized.

The strainer 70, including a housing 71 and a screen (a filtering medium) 72 which, being housed inside the housing 71, can filter the hydraulic oil, is disposed between the valve body 21 and oil pan 60. As shown in FIG. 1, the housing 71 is formed of an upper housing 73 and a lower housing 75, each of which is formed from a plate material (for example, a steel plate) such as a metal which is a magnetic body. The upper housing 73 has a hydraulic oil outlet 73*o* fitted in a hydraulic oil suction inlet 21*i* formed in the valve body 21. The upper housing 73 may be formed from a resin or the like which is a nonmagnetic body. Also, the hydraulic oil suction inlet 21*i* of the valve body 21 is connected to an inlet of the oil pump 25 via a predetermined oil passage.

Figure 2:
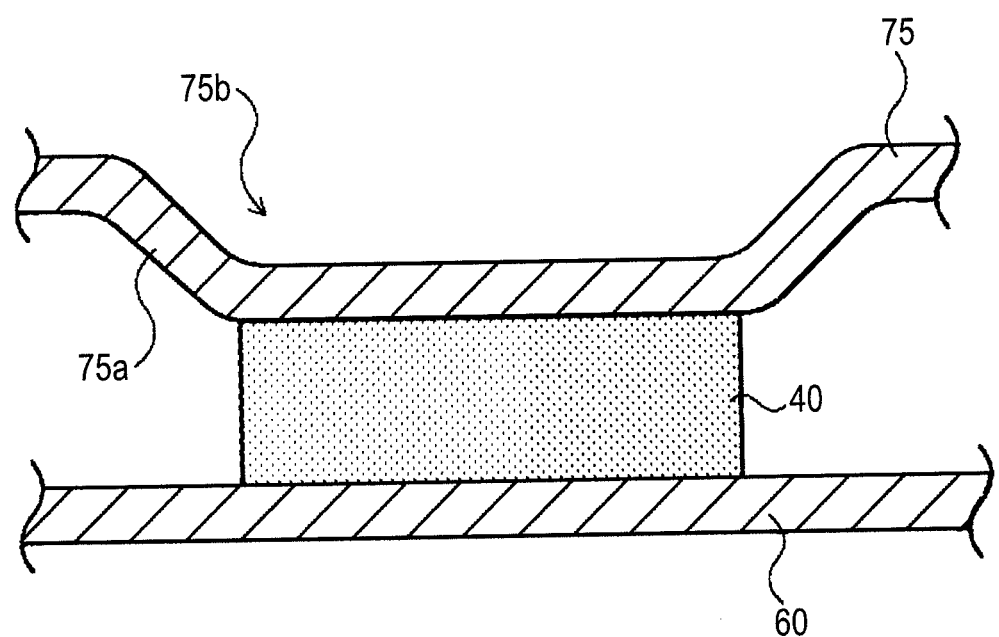
FIG. 2 is a sectional view showing a main portion of the hydraulic control device 20.

A hydraulic oil inlet 75*i* which, opening into the oil pan 60 side, allows communication between the interior of the housing 71 and the interior of the oil pan 60 is formed in the lower housing 75 forming a bottom portion of the housing 71. Furthermore, a plurality (three in the embodiment) of projections 75*a* projecting toward the oil pan 60 are formed on the lower housing 75 in such a way as to define depressions 75*b* in the housing 71, as shown in FIGS. 1 and 2. Then, (a total of three) magnets (permanent magnets) 40 are disposed one between each projection 75*a* and the oil pan 60. Because of this, the individual magnets 40 are adsorbed to both the corresponding projections 75*a* of the lower housing 75 and the oil pan 60, meaning that the strainer 70 can be firmly fixed to the oil pan 60 by the magnetic force of each magnet 40. Also, by providing the projections 75*a* on the lower housing 75 forming the bottom portion of the housing 71 in this way, it is possible to more accurately set the distance between the housing 71 and the oil pan 60 while fixing the strainer 70 to the oil pan 60 without increasing the height of the magnets 40, meaning that it is possible to smoothen the flow of the hydraulic oil in the oil pan 60, and also, to suction the hydraulic oil into the housing 71 from the oil pan 60 smoothly.

Also, in the embodiment, the plurality of projections 75*a* of the lower housing 75 and the plurality of magnets 40 are disposed in positions in which the flow rate of the hydraulic oil in the oil pan 60 is comparatively low. FIG. 3 is an illustration of the hydraulic control device 20 in a condition in which the oil pan 60 is removed as seen from the underside. As shown in the drawing, in the hydraulic control device 20 of the embodiment, the plurality of projections 75*a* of the lower housing 75 and the plurality of magnets 40 are disposed in such a way as not to be positioned on straight lines (refer to the alternate long and short dash lines in FIG. 3) connecting the centers (the centers of the holes) of hydraulic oil inflow portions 50 positioned on the right side in the drawing of the hydraulic oil inlet 75*i* and the center of the hydraulic oil inlet 75*i* of the strainer 70. Because of this, it is possible to effectively prevent the flow of the hydraulic oil in the oil pan 60, that is, the flow of the hydraulic oil from the hydraulic oil inflow portions 50 toward the hydraulic oil inlet 75*i*, from being impeded by the projections 75*a* of the housing 71 and the magnets 40.

When the automatic transmission equipped with the hydraulic control device 20 configured in the way heretofore described operates, the oil pump 25 is driven by the engine connected to the automatic transmission being operated, and as shown by the solid arrows in FIG. 1, the hydraulic oil is suctioned from the oil pan 60 via the hydraulic oil inlet 75*i*, screen 72, the hydraulic oil outlet 73*o*, and the like, of the strainer 70, and supplied to the hydraulic circuit and the like, formed of the valve body 21 oil passages, solenoid valves 30, and the like, by the oil pump 25. Then, the hydraulic oil used in the hydraulic circuit and the like are caused to flow back again into the oil pan 60 from the hydraulic oil inflow portions 50.

It may happen that foreign particles such as metal powder are mixed in the hydraulic oil caused to flow back to the oil pan 60 in this way but, with the hydraulic control device 20 of the embodiment, it is possible, in the oil pan 60, to attract and capture foreign particles such as metal powder in the hydraulic oil with the magnetic force of the plurality of magnets 40 disposed between the lower housing 75 of the strainer 70 and the oil pan 60. Also, in the hydraulic control device 20 of the embodiment, the magnetic force of each magnet 40 acts on not only the inside of the oil pan 60, but also the back side of the projections 75*a* of the lower housing 75, that is, the side of the depressions 75*b* demarcated in the housing 71. Consequently, even in the event that foreign particles such as metal powder are contained in the hydraulic oil suctioned into the strainer 70 from the oil pan 60, foreign particles in the hydraulic oil flowing in the housing 71 can also be attracted by the magnetic force of the magnets 40 acting on the inside of the housing 71 from the oil pan 60 side, and retained in the depressions 75*b*.

With the heretofore described hydraulic control device of the embodiment, the strainer 70 for filtering the hydraulic oil from the oil pan 60 is fixed to the oil pan 60 by the magnetic force of the plurality of magnets 40. Because of this, it is possible to stably and easily fix the strainer 70 between the valve body 21 and the oil pan 60 while curbing a complication in structure and an increase in the number of parts in a case of using a fastener such as a bolt. Also, with the hydraulic control device 20 of the embodiment, it is also possible to capture foreign particles such as metal powder contained in the hydraulic oil in the oil pan 60 using the magnets 40 for fixing the strainer 70 to the oil pan 60. The number of magnets 40 disposed between the oil pan 60 and strainer 70 may be less than three, provided that it is sufficient to firmly fix the strainer 70 to the oil pan 60. Also, with the hydraulic control device 20 of the embodiment, both the oil pan 60 and the lower housing 75 of the strainer 70 are formed from a magnetic body such as a metal, and the magnets 40 are adsorbed to both the oil pan 60 and the lower housing 75 (strainer 70), but the invention is not limited to this. That is, either the oil pan 60 or a bottom portion (lower housing 75) of the strainer 70 maybe formed from a nonmagnetic body such as a resin, and the magnets 40 may be fixed (bonded) to either the oil pan 60 or the bottom portion of the strainer 70, and adsorbed to the other.

Also, the strainer 70 of the embodiment has the housing 71 housing the screen 72, the lower housing 75 forming an oil pan 60 side bottom portion of the housing 71 includes the projections 75a projecting toward the oil pan 60 in such a way as to define the depressions 75b in the housing 71, and the magnets 40 are disposed between the projections 75a and the oil pan 60. By disposing the magnets 40 between the projections 75a provided on the bottom portion of the housing 71 of the strainer 70 and the oil pan 60 in this way, it is possible to reduce the height of the magnets 40, and also, to more appropriately set the distance between the oil pan 60 and the strainer 70. Also, in the embodiment, the lower housing 75 configuring the housing 71 is formed from a metal which is a magnetic body. Consequently, by causing the magnetic force of the magnets 40 disposed between the projections 75a of the lower housing 75 and the oil pan 60 to act more strongly on the back side of the projections 75a, that is, the side of the depressions 75b in the housing 71, it is possible to more strongly attract foreign particles such as metal powder contained in the hydraulic oil in the housing 71 of the strainer 70 with the magnetic force of the magnets 40, and more reliably retain them in the depressions 75b. Instead of the bottom portion of the housing 71, that is, the whole of lower housing 75 being formed from a metal or the like which is a magnetic body, as in the heretofore described embodiment, only the projections 75a of the lower housing 75 (housing 71) may be formed from a metal or the like which is a magnetic body. Also, even in the case in which the projections 75a of the housing 71 are formed from a nonmagnetic body such as a resin, when the magnetic force of the magnets 40 disposed between the projections 75a and the oil pan 60 acts on the back side of the projections 75a, that is, the side of the depressions 75b in the housing 71, it is possible to attract foreign particles such as metal powder contained in the hydraulic oil in the housing 71 of the strainer 70 with the magnetic force of the magnets 40, and retain them in the depressions 75b.

Furthermore, in the heretofore described embodiment, the plurality of magnets 40 are disposed in positions in which the flow rate of the hydraulic oil in the oil pan 60 is comparatively low, and are not disposed on the straight lines connecting the hydraulic oil inflow portions 50 connecting with the oil pan 60 and the hydraulic oil inlet 75i of the strainer 70. Because of this, it is possible to prevent the flow of the hydraulic oil in the oil pan 60 from being impeded by the magnets 40.

As the embodiment is one example for specifically describing a mode for carrying out the invention described in the section of the disclosure of the invention, the correspondence relationship between the main elements of the embodiment and the main elements of the invention described in the section of the disclosure of the invention does not limit the elements of the invention described in the section of the disclosure of the invention. That is, the interpretation of the invention described in the section of the disclosure of the invention should be made based on the description of the section, and the embodiment is only one specific example of the invention described in the section of the disclosure of the invention.

A description has heretofore been given, using the embodiment, of the mode for carrying out the invention but, the invention not being limited to this kind of embodiment in any way, it goes without saying that the invention can be carried out in various modes without departing from the scope thereof.

The invention can be utilized by the hydraulic control device manufacturing industry.

What is claimed is:

1. A hydraulic control device comprising: a valve body; a solenoid valve incorporated in the valve body; an oil pan which, being disposed below the valve body, accumulates hydraulic oil; and a strainer which, as well as being disposed between the valve body and the oil pan, has a filtering medium which filters the hydraulic oil suctioned from the oil pan, wherein
    the strainer is fixed to the oil pan by a magnetic force of a magnet, wherein the strainer has a housing which houses the filtering medium,
    a bottom portion of the housing on the oil pan side includes a projection which projects toward the oil pan in such a way as to define a depression in the housing, and
    the magnet is disposed between the projection and the oil pan.

2. The hydraulic control device according to claim 1, wherein at least the projection of the housing is formed from a magnetic body.

3. The hydraulic control device according to claim 2, wherein the magnet is not disposed on a straight line connecting a hydraulic oil inflow portion connecting with the oil pan and a hydraulic oil inlet of the strainer.

4. A hydraulic control device comprising: a valve body; a solenoid valve incorporated in the valve body; an oil pan which, being disposed below the valve body, accumulates hydraulic oil; and a strainer which, as well as being disposed between the valve body and the oil pan, has a filtering medium which filters the hydraulic oil suctioned from the oil pan, wherein
    the strainer is fixed to the oil pan by a magnetic force of a magnet, wherein
    the magnet is not disposed on a straight line connecting a hydraulic oil inflow portion connecting with the oil pan and a hydraulic oil inlet of the strainer.

* * * * *